Aug. 4, 1931.  H. T. HUNTER  1,817,887
COOKING APPARATUS
Filed Aug. 12, 1929   5 Sheets-Sheet 1
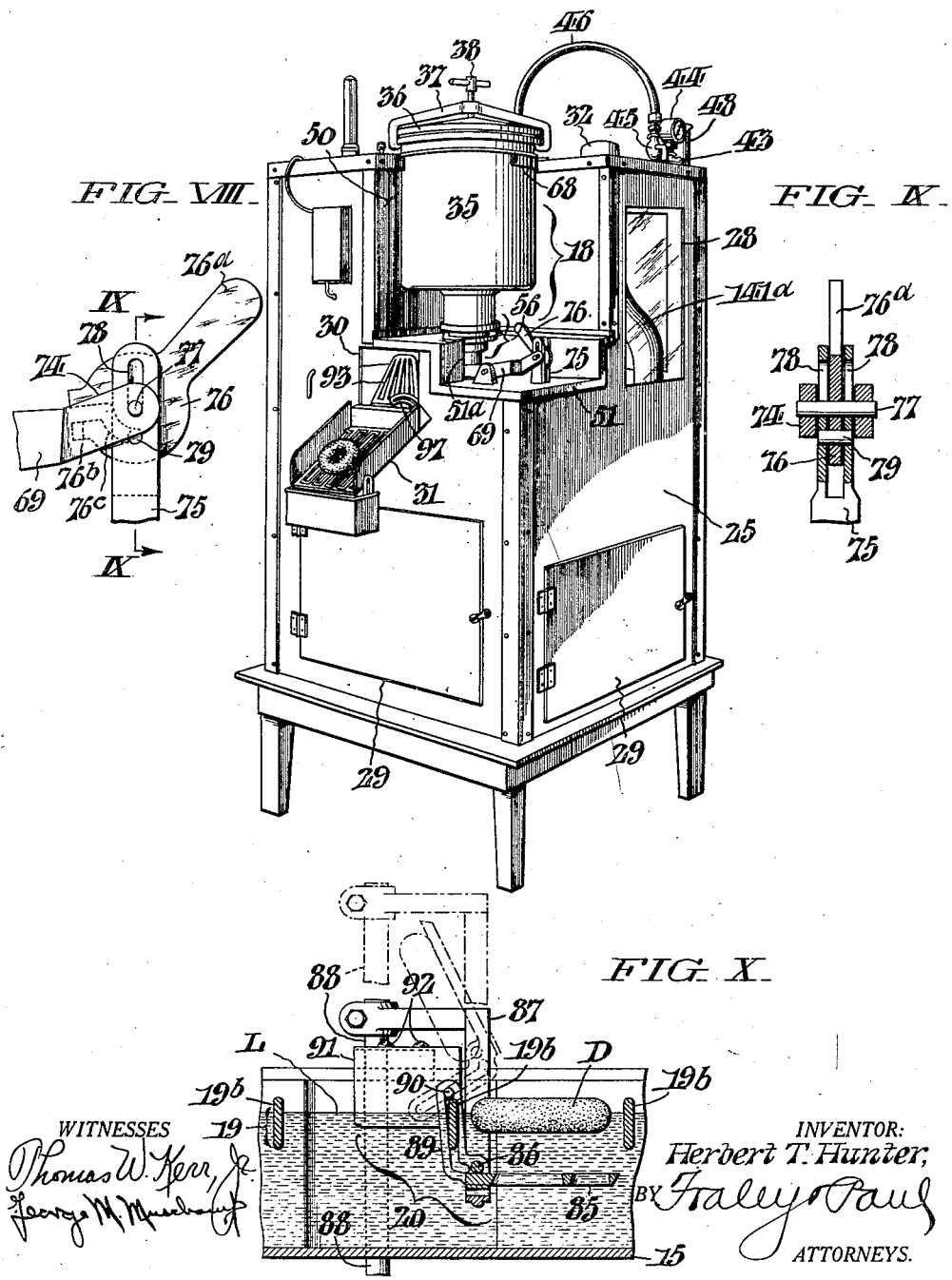

Aug. 4, 1931.  H. T. HUNTER  1,817,887
COOKING APPARATUS
Filed Aug. 12, 1929   5 Sheets-Sheet 2
FIG. II.
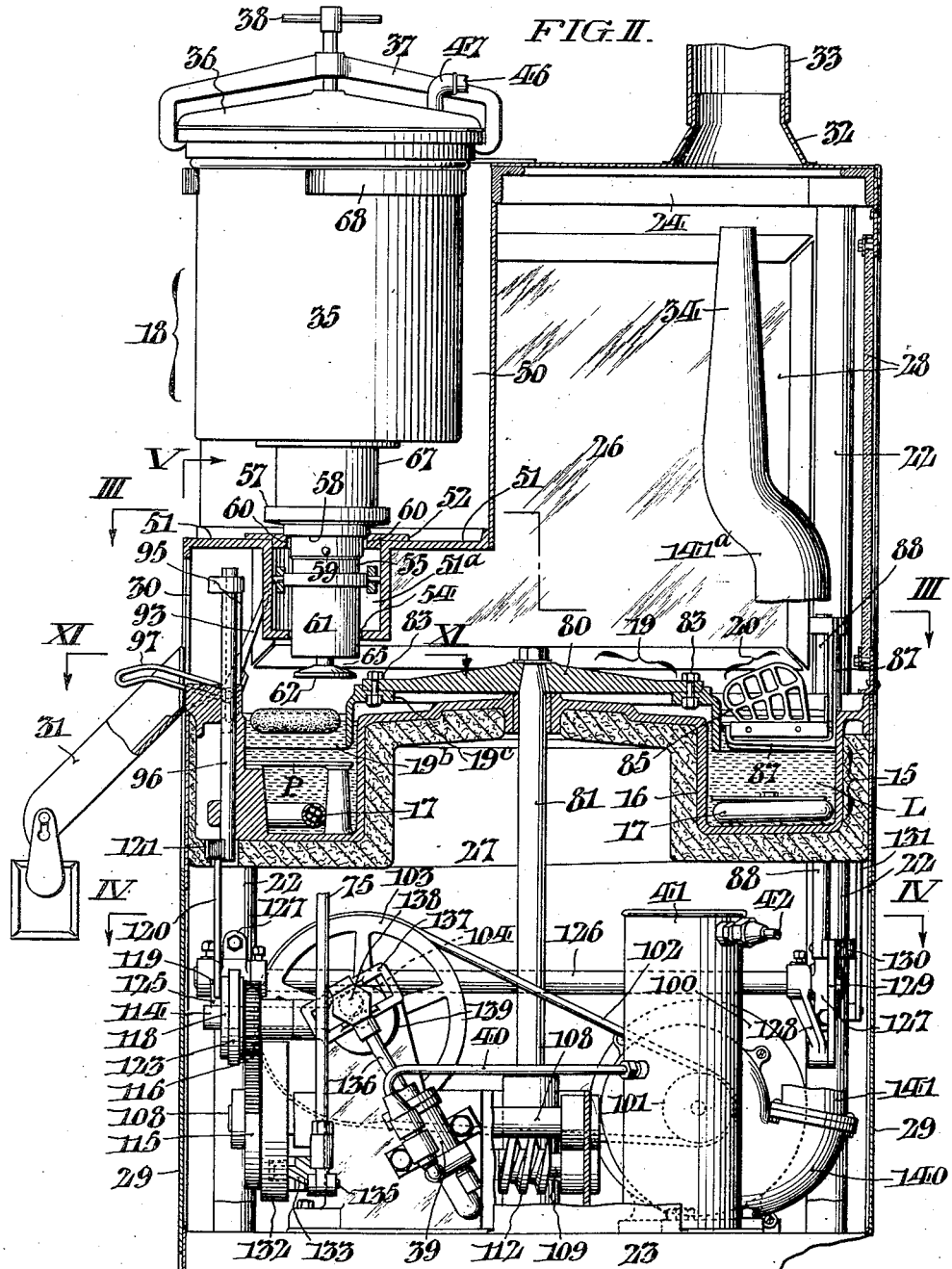
WITNESSES  INVENTOR:
Herbert T. Hunter,
BY
ATTORNEYS.

Aug. 4, 1931.    H. T. HUNTER    1,817,887
COOKING APPARATUS
Filed Aug. 12, 1929    5 Sheets-Sheet 3
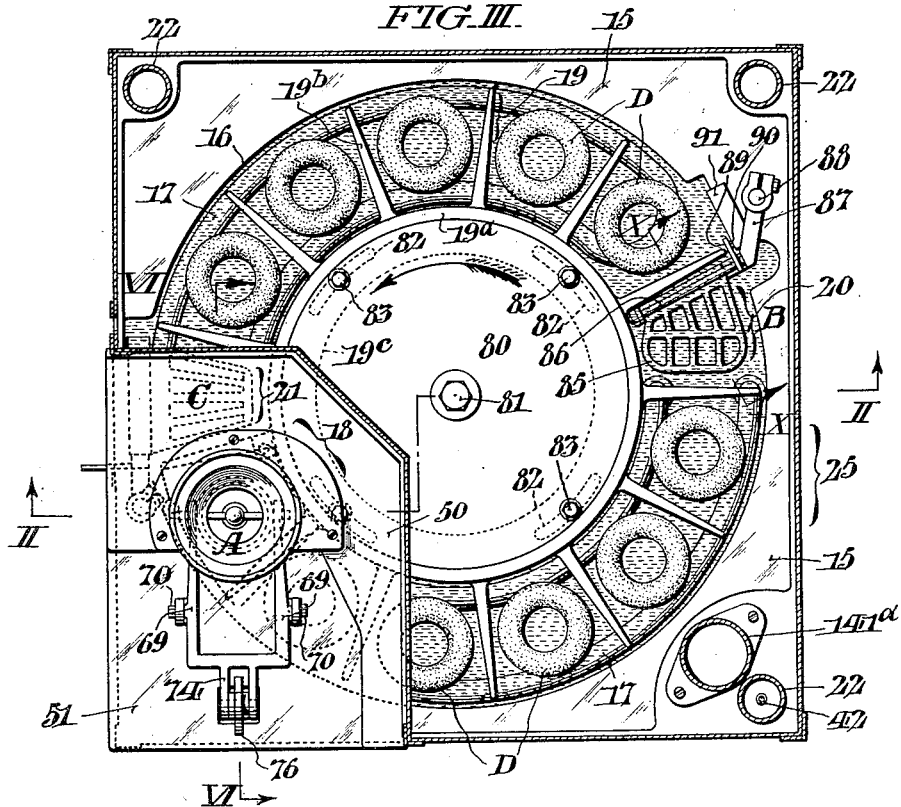
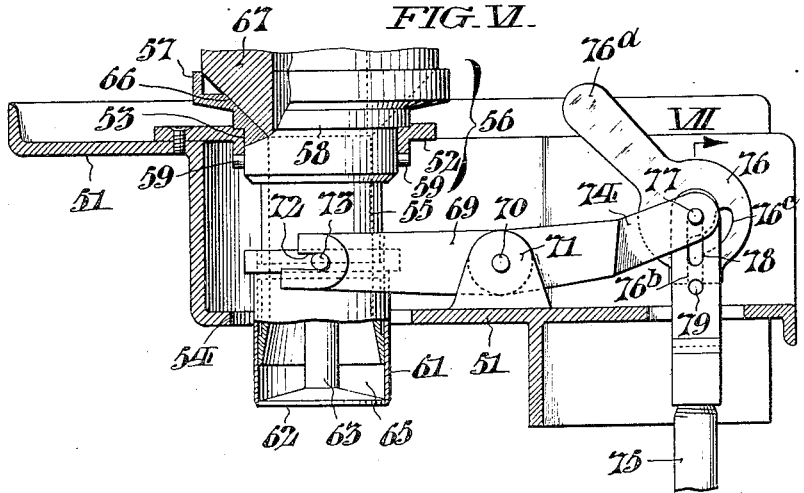
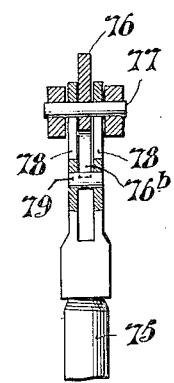
WITNESSES
Thomas W. Kerr, Jr.
George M. Muschamp
INVENTOR:
Herbert T. Hunter,
BY
ATTORNEYS.

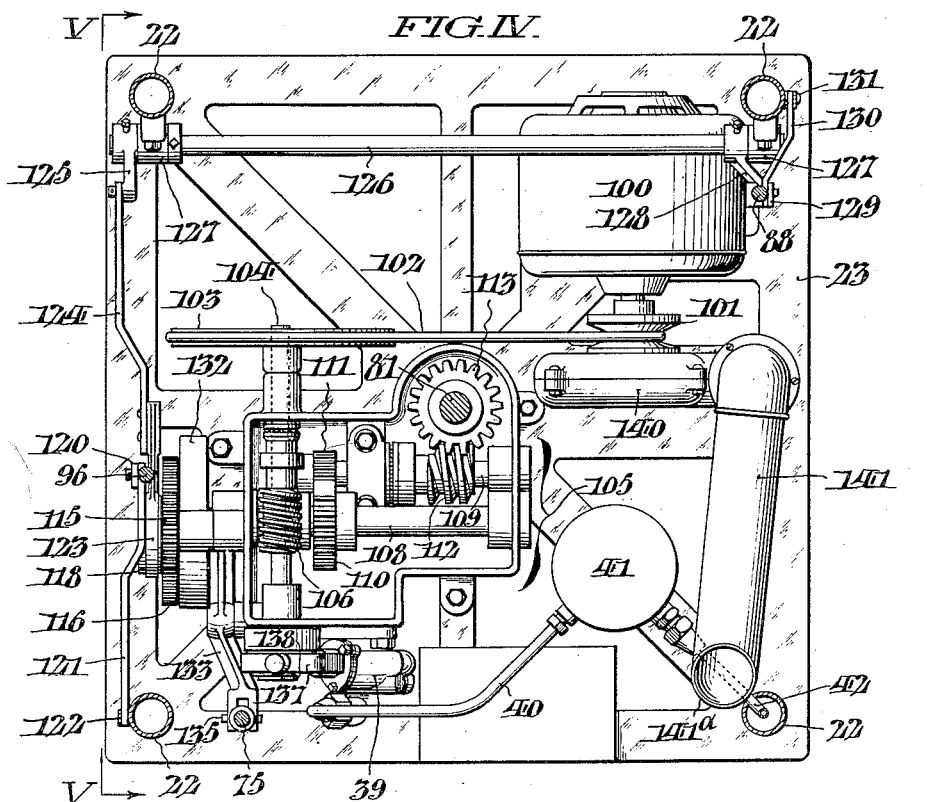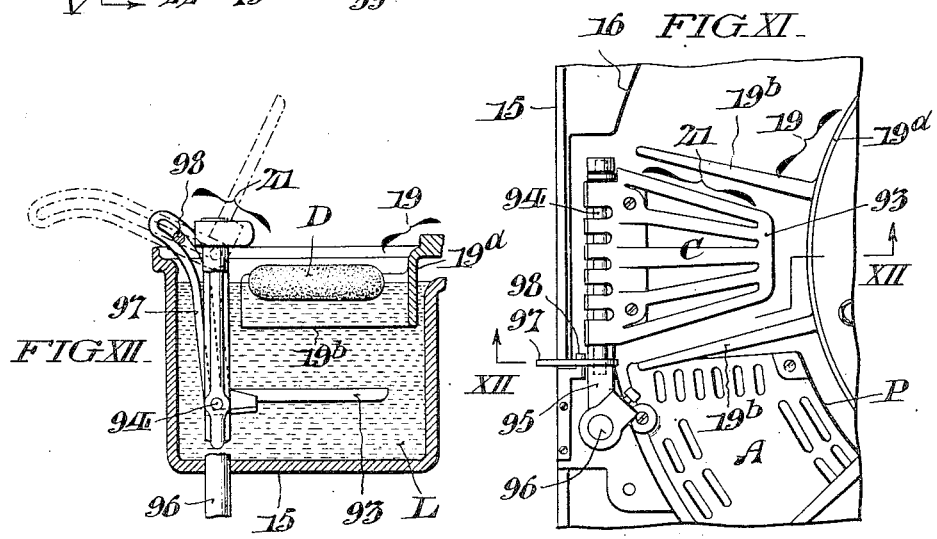

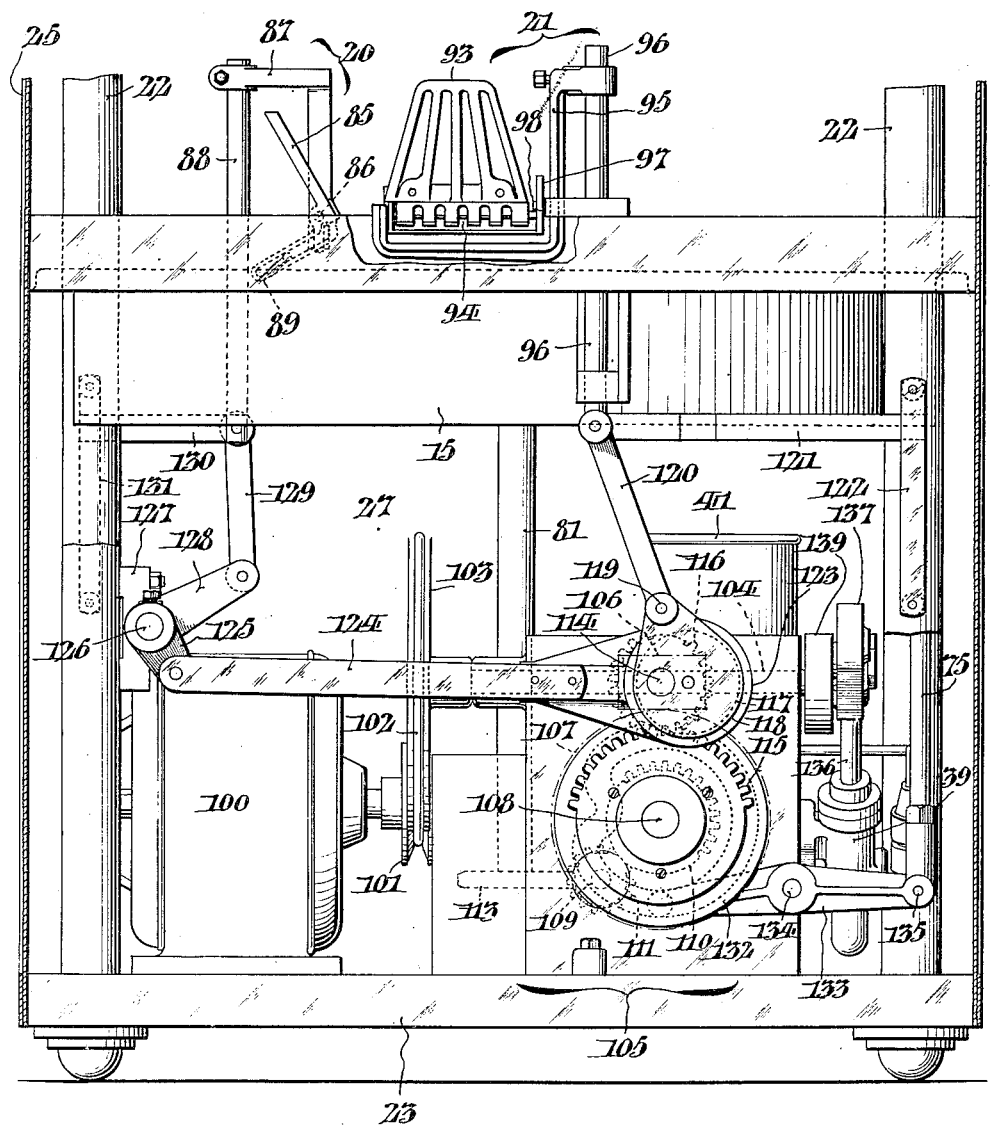

Patented Aug. 4, 1931

1,817,887

UNITED STATES PATENT OFFICE

HERBERT T. HUNTER, OF CATONSVILLE, MARYLAND, ASSIGNOR TO DOUGHNUT MACHINE CORPORATION, OF NEW YORK, N. Y., A CORPORATION OF NEW YORK

COOKING APPARATUS

Application filed August 12, 1929. Serial No. 385,158.

This invention relates to apparatus for automatically cooking articles such as doughnuts in hot cooking liquor. More specifically, it has reference to cooking apparatus of the type disclosed in a copending application, Serial Number 377,536, filed by John C. Bergner on July 10, 1929, wherein the raw articles are successively released by a forming means to drop into a receptacle having a single annular channel, and wherein the articles are turned over after having been progressed half way around the channel and finally ejected from the apparatus fully cooked and uniformly browned after completion of their travel in the receptacle.

The purpose of the present invention is to afford, in connection with cooking apparatus of the specific type referred to, refinements which render the apparatus more compact as a whole; which insure against the possibility of derangement and untiming of the means instrumental in turning the articles during cooking and in ejecting them from the apparatus when fully cooked; and in general to facilitate care and operation of the apparatus, particularly with regard to removal for cleaning of the parts constituting the means by which the raw articles are formed, and control of the die mechanism of said forming means while the apparatus is in operation.

Other objects and attendants advantages of this invention will be manifest from the detailed description which follows in conjunction with the attached drawings.

Fig. I is a perspective view of my improved doughnut cooking apparatus.

Fig. II is a vertical section view, taken as indicated by the arrows II—II in Fig. III along a staggered plane.

Fig. III is a plan sectional view of the apparatus, taken as indicated by the arrows III—III in Fig. II.

Fig. IV is a plan sectional view at a lower plane than Fig. III, taken as indicated by the arrows IV—IV, and showing the drive mechanism of the apparatus.

Fig. V is a fragmentary vertical sectional view of the apparatus on a larger scale, and taken as indicated by the arrows V—V in Figs. II and IV.

Fig. VI is a fragmentary sectional view, taken as indicated by the arrows VI—VI in Fig. III, showing certain parts of the forming means.

Fig. VII is a detail section, taken as indicated by the arrows VII—VII in Fig. VI.

Fig. VIII is a view like Fig. VI but with the illustrated parts in different positions.

Fig. IX is a sectional view, like Fig. VII, taken as indicated by the arrows IX—IX in Fig. VIII.

Fig. X is a fragmentary detail sectional view, taken as indicated by the arrows X—X in Fig. III.

Fig. XI is a partial plan view of the cooking receptacle, looking as indicated by the arrows XI—XI in Fig. II, and showing the manipulating means whereby the cooked articles are ejected from the apparatus; and, Fig. XII is a detail sectional view taken along a staggered plane, as indicated by the arrows XII—XII in Fig. XI.

As in the application hereinbefore referred to, the apparatus herein delineated comprises a cooking receptacle structure 15 of square configuration with an annular well or channel 16 for the cooking liquor L which may be heated in any convenient manner, for example, by a submerged electric coil shown at 17 in Figs. II and III. Incident to operation of the machine, raw rings of dough such as conventionally represented at D are successively formed by a means 18 and released to drop into the cooking liquor L within the circular channel 16 at a station A (Fig. III). The raw formations D so released are received individually in cells set apart in the annular channel 16 of the receptacle 15 by a progressing means indicated generally at 19, and, at the station A are prevented from sinking beneath said progressing means until sufficiently buoyant to float, by a horizontal stop plate P submerged in the liquor L, see Figs. II and XI. Through suitable provisions hereinafter described, the progressing means 19 is intermittently rotated in coordinated timed relation with periodic operation of the forming means 18 so that its cells are successively brought into position beneath said forming means at the station A to receive the raw formations D. At a station B substantially half way around the channel 16 from the forming means 18, a manipulating means 20 operates to transfer each article D to a cell of the progressing means 19 immediately in advance (with regard to the direction of rotation of said progressing means indicated by the arrow in Fig. III) of the cell initially occupied, the article D being incidentally turned over so that its opposite side is cooked during travel through the remaining half of the channel 16. After completing the circuit in the channel 16, the articles D are individually ejected from the apparatus by another manipulating means 21 at a station C immediately adjacent the station A. It is important to note here that the allocation of the manipulating means 20 relative to the introducing and ejecting stations A and C is such as to determine a somewhat longer travel for the doughnuts or articles D in the channel 16 before being turned over than after. This insures uniform browning all over which would not result if the two periods were of equal duration since the up side of the doughnuts or articles D are partly browned during the initial period and would therefore be darker when the cooking is completed with said sides in direct contact with the liquor L. The desired effect is conveniently attained in the present instance through construction of the progressing means 19 with an uneven number of cells, to wit, thirteen with the manipulating means 20 operating in the seventh cell counting from the station A in the direction of progression. By mechanism also described in detail hereinafter, the manipulating means 20, 21 are actuated in alternation with the forming means 18 and the progressing means 19, so that an article D is transferred and turned, and another ejected from the apparatus concurrently with release of a new raw formation into the cooking liquor.

As shown in Fig. II, the receptacle structure 15 is supported at an elevation by tubular corner posts 22 upstanding from a horizontal base frame 23, and joined above said receptacle structure by a top frame 24. The several parts just described constitute the skeleton of the apparatus which is completely enclosed in a casing 25 of sheet metal. By virtue of its medial position in the casing 25, the receptacle structure 15 sets apart an upper cooking chamber 26, and a lower machinery compartment 27. To enable observation of the cooking within the chamber 26, the upper portion of the casing 25 is provided on three sides with glazed windows 28; while doors 29 below the receptacle structure 15 permit access to the machinery within the compartment 27, see Fig. I. The casing 25 is moreover provided at the front with an opening 30 through which the cooked articles D are ejected to fall upon an inclined discharge chute 31, as well as with a convergent outlet 32 in its top for escape of the hot fumes rising from the cooking liquor L into a connecting flue 33, discharge through said outlet being accelerated under Venturi action by an air blast directed upwardly thereinto from a coaxially arranged nozzle 34.

Referring to Figs. II and III, the forming means 18 comprises a cylindric dough magazine 35 which is provided with a removable cover 36 held down in air tight relation to the magazine body by a yoke 37 fitted with a clamp screw 38. The dough is expelled from the magazine 35 under the action of compressed air supplied by a system including a pump 39 which is located in the machinery compartment 27 beneath the cooking receptacle 15 and delivers, through a pipe 40, to a pressure equalizing tank 41. From this tank 41, the compressed air is conducted, through another pipe 42 that leads up through one of the corner posts 22 (Fig. III) to a fitting 43, Fig. I, on the roof of the casing 25. This fitting 43 affords connection for a pressure gage 44 (Fig. I) and a valve 45, with a nipple for attachment of a flexible tube or hose 46 which reaches to a nipple 47 (Fig. II) on the cover 36 of the dough magazine 35. The fitting 43 also affords connection for a bleed device 48 of conventional design to control the pressure of the air and the size of the raw formations released by the forming means 18. In order that the forming means 18 may be accommodated within the confines of the casing 15, said casing is formed, as shown in Figs. I, II and III, with a niche 50 through lateral recessing of one of its corners from the exterior above the level of the receptacle structure 15. By virtue of this provision or niche 50, outside air is free to circuate around the dough magazine 35 to maintain the contents thereof cool and fresh notwithstanding protracted periods of idleness of the apparatus. Referring to Figs. II, III and VI, it will be noted that a horizontal plate 51 serves as the floor for the niche 50, said plate being stepped in cross section and recessed near the center, as at 51a. To the upper ledge of the plate 51 is secured a horizontal bracket piece 52 which over-reaches the recess 51a, Fig. I and has a circular aperture 53 (Fig. VI) in axial alignment with an opening 54 in the lower ledge of said plate, for reception of a tubular member 55 that extends down into close proximity to the level of the liquor L in the receptacle 15. This tubular member 55 constitutes a part of a die mechanism 56, as well as an outlet receiving the dough from the magazine 35.

As shown in Figs. II, III and VI, the tubular member 55 has a flange head 57 at the top with a shoulder 58 immediately therebeneath to rest upon the bracket piece 52; and at diametrically opposite points said member is provided with laterally projecting studs 59 adapted to be passed through notches 60 (Fig. II) at opposite side edges of the aperture 53 in the bracket piece 52. After insertion of the reduced portion of the tubular member 55, the latter is secured against vertical displacement by slight turning thereof, the studs 59 thus cooperating with the lower edge of the opening 53 after the manner of a bayonet lock. As shown in Fig. VI, the diametrically reduced portion of the tubular member 55 acts as a guide for a vertical sliding cutter sleeve 61 which cooperates with a shearing disk 62 sustained by a stem 63 fixed axially within said tubular member. The disk 62, it will be noted, lies in a plane somewhat below the lower edge of the tubular member 55 so that, with the sleeve 61 raised as in Fig. II, an annular die opening 65 is formed through which rings of raw dough are expelled under the action of the compressed air within the magazine 35 and subsequently severed upon descent of said sleeve with each actuation of the die mechanism 56. Referring again to Fig. VI, the flange head 57 of the tubular member 55 affords a conical seat 66 to support the axial neck prolongation 67 at the bottom of the dough magazine 35, which neck prolongation is corespondingly beveled, as shown, so that a dough tight seal is maintained solely under the weight of said magazine. To assist in the support of the dough magazine 35, I secure within the niche 50 of the casing 25 a split spring ring clamp 68 to engage it near the top, said ring having capacity for yielding readily to permit lifting of the magazine 35 from the apparatus for re-charging, cleaning, etc., without necessity for disturbing the die mechanism 56. The means relied on for actuating the cutter sleeve 61 includes a rocking yoke lever 69 with trunnions 70 engaging bearing lugs 71 upstanding from the floor plate 51 of the niche 50 in Fig. VI, the yoke arm 69 straddles the cutter sleeve 61, and its branch extremities are bifurcated as at 72 to engage diametral studs 73 on the cutting sleeve 61. These bifurcations 72 are so proportioned that the studs 73 automatically clear when the tubular member 55 of the die mechanism 56 is removed. The tail of the yoke lever 69 is clevised as at 74 to receive the connecting end of an actuating rod 75 that extends down through an opening in the plate 51 into the machinery compartment 27, for coordination with the operating means therefor, which is later on described. Associated with the yoke lever 69 is a coupling member 76 having the form of a disk with a handle 76a. As shown in Figs. VII and IX, the coupling member 76 occupies the bifurcation at the upper end of the actuating rod 75 and is swingable about a pin 77 that extends crosswise of the clevis 74 of the yoke lever 69, the bifurcation being vertically slotted, as at 78, for passage of said pin. The coupling member 76 has an open radial edge notch 76b that leads into an arcuate spur 76c which is concentric with the pin 77. Below the slots 78 another pin 79 extends transversely of the bifurcation of the connecting rod 75. When the coupling member 76 is swung to the position of Figs. VI and VII so that its radial edge notch 76b becomes aligned with the slots 78, the operative connection between the yoke lever 69 and the actuating rod 75 is obviously broken since the pin 79 may, under this condition, ride up and down in said notch with the sleeve 61 of the die mechanism 56 quiescent in its lowered position and closing the die opening 65, as in Fig. VI. When, on the other hand, the coupling member 76 occupies the position shown in Fig. VIII, with the pin 79 engaging the arcuate portion 76c of the notch 76b, the yoke lever 69 is operatively coupled with the actuating rod 75 to effect movement of the cutter sleeve 61. Through the provisions just described, it is apparent that the die mechanism 56 can be readily and quickly rendered inoperative when desired or required without necessitating stoppage of the apparatus as a whole.

Referring again to Figs. II and III, it will be observed that the progressing means 19 is in the form of a spider, i. e. an annulus 19a with radially projecting vanes 19b at uniform circumferential distances, said vanes setting apart within the channel 16 of the cooking receptacle 15 the cells which maintain the doughnuts or articles D definitely separated afloat in the cooking liquor L. The progressing spider 19 is secured to a discus head 80 which is in turn fastened to the top end of a shaft 81 that extends through a central bearing afforded by the receptacle 15 down into the machinery compartment 27. To enable angular adjustment of the spider 19 with respect to the manipulating means 20, 21, the internal horizontal flange of said spider 19c (Fig. II) is arcuately slotted at appropriate intervals, as at 82 in Fig. III, for passage of securing bolts 83.

As detailed in Fig. X, the manipulating means 20 by which the articles D are inverted and transferred from one cell to another of the progressing spider 19, comprises an element in the form of a hand 85 capable of swinging movement about a pivot axis 86 which lies substantially radial to the center of rotation of said spider. The pivot axis 86 is carried by an angular supporting bracket member 87 that reaches downward from the top of a vertical actuating rod 88. This actuating rod 88 extends down into the machinery compartment 27 within the casing through an opening in the apron of the cooking receptacle 15 near one corner of the latter, see Figs. III and V, and is guided for reciprocation in a suitable bearing, not shown. Normally the hand 85 occupies a horizontal submerged position in the cooking liquor L so that the articles D may float over the top of the same in readiness to be transferred. The swinging movement necessary to the accomplishment of the just indicated function is obtained through cooperation between a longitudinally slotted member or arm 89 which extends perpendicularly from the hand 85, and a projection 90 on a bracket 91 secured to the receptacle 15 with capacity for adjustment, by screws 92. In this connection it is to be particularly noted that the arm 89 and its slot are slightly tangential to the pivot axis 86. Thus, in operation, as the hand 85 is lifted by the rod 88, it engages the article D at that time above it, and lifts such article horizontally to the level of the top of the progressing spider 19 until the pivot axis 86 passes above the level of the projection 90 whereupon, due to the short leverage occasioned by the tangential offset of the slot in the arm 89 relative to said axis, a rapid flipping movement is induced whereby the article D is discharged over the vane 19b of the progressing spider 19 to drop into the next cell ahead of the one initially occupied, in a manner obvious from Fig. X. It is further to be observed that since the slotted arm 89 is in continuous engagement with the positionally fixed cooperating projection 90, the described action is always positive; and moreover that the simplicity of these parts insures against the possibility of easy derangement and untiming of the manipulating means 20.

The means 21 (Figs. V, XI and XII) by which the cooked articles D are ejected from the apparatus is generally similar to the means 20 in that a lifting hand 93 is pivoted on an axis 94 supported by a suitable bracket arm 95, and in that said bracket arm is secured to the top of a vertically reciprocating actuating rod 96 which extends down through the receptacle structure 15 into the machinery compartment 27 beneath. A difference will however be noted here in that the pivot axis 94 is tangential to the spider 19, and in that the slotted arm 97, of the hand 93, is in line with said pivot axis. Thus, incident to cooperation with the projection 98, a more gradual swinging movement is induced in the hand 93 to the avoidance of the flipping described in connection with the means 20, the purpose here being to merely bring the article D above the level of the liquor L in the receptacle 15 and to tilt it to such an angle that insures easy discharge onto the delivery chute 31 without necessarily turning it over.

The drive mechanism of the apparatus includes an electric motor 100 (Figs. II, IV and V) which is bolted fast to the lower cross frame 23 within the machinery compartment 27 of the casing 25. As shown, the motor 100 is equipped with a pulley 101 which is coordinated by a belt 102 with a sheave 103 on the power input shaft 104 of a transmission unit comprehensively designated 105. Within the housing of this transmission unit the shaft 104 carries a worm 106 in mesh with a worm wheel 107 (Fig. V) on a master shaft 108, at right angles to the shaft 104. A second counter shaft 109 within the housing of the unit 105 receives intermittent motion from the shaft 108 through a mutilated gear couple 110, 111, and, in turn, carries a worm 112 (Fig. IV) to drive a worm wheel 113 at the lower end of the shaft 81 of the progressing spider 19. Still another shaft 114 with bearing support in the housing of the transmission unit 105 receives intermittent movement from the master shaft 108 through a pair of cooperating mutilated gear wheels 115, 116. At one end the shaft 114 has secured to it an eccentric disk 117 (Fig. V) whereto is attached a supplemental disk 118 with a crank pin 119. Through a connecting link 120, the crank pin 119 communicates the required up and down movement to the rod 96 for the manipulating means 21 whereby the cooked articles D are ejected from the apparatus in the manner previously explained. To prevent rotation, incident to reciprocation, the actuator rod 96 is formed with a lateral extension 121 which engages a guide 122 on one of the posts 22. The manipulating means 20 for turning over the articles D in the cooking liquor L, is concurrently operated from the same source, i. e. the eccentric disk 117 through interposed motion translating means including a strap 123 in association with said disk, whereof the rod 124 connects with an arm 125 on that end of a horizontal rock shaft 126 nearest the observer in Fig. V. This rock shaft 126 extends crosswise between bearings 127 on two adjacent posts 22 of the skeleton of the apparatus, see Fig. IV also. On its opposite end the shaft 126 carries another arm 128, which, as shown, is coupled by means of a link 129 with the lower end of the vertically reciprocating actuator rod 88 of the manipulating means 20, said rod being prevented from turning through engagement of a lateral extension 130 thereof in a guide 131 on the contiguous post 22 as shown in Figs. IV and V, after a manner similar to that described in connection with the actuating rod 96 of the manipulating means 21.

The die mechanism 56 of the forming means 18 derives its motion from the master shaft 108 of the transmission unit 105, which shaft has secured to it behind the gear 115 (Figs. II, IV and V) a side groove cam disk 132. This cam disk 132 is influential upon a lever 133 fulcrumed intermediate its ends on a stud 134 projecting from the casing of the transmission unit 105, and it is pivotally coordinated at 135 with the actuating rod 75 of the die mechanism 56. With the cam disk 132 and the mutilated gears 110, and 111, as well as 115 and 116 set as in Fig. V, the transmission unit 105 obviously determines concurrent operation of the forming means 18, and the manipulating means 20, 21 in alternation with the progressing means 19 as hereinbefore set forth.

The pump 39 of the air compressing system is of the reciprocating type, and, as shown, in Figs. II, IV and V, has its cylinder aligned with the power input shaft 104 of the transmission casing. The piston rod 136 of the pump 39 is fitted at its outer end with a yoke 137 that affords a transverse slot to cooperate with a crank stud 138 projecting from a disk 139 on the shaft 104. By this arrangement the pump 39 is operated at a high speed without attendant noise or vibration; and accordingly delivers a substantially steady stream of compressed air into the pressure equalizing tank 41.

The flow of air projected from the nozzle 34 into the exhaust outlet 32 at the top of the casing 25 is produced by a rotary blower 140 bolted fast to the base frame 23 within the machinery compartment 27 alongside the motor 100, whereto it is coupled direct as shown in Fig. IV. The blower 140 constantly draws air from the machinery compartment 27, which is replaced by fresh air from the exterior so that the working parts within said chamber are protected against heat radiating from the liquor L in the receptacle 15. The air thus sucked by the blower 140 is conducted to the nozzle 34 through a conduit 141 with a branch 141a that leads vertically through the receptacle 15 at one corner of the latter, as clearly shown in Fig. III. The cooking chamber 26 is continuously evacuated by the action of the nozzle 34, and the air replaced by induction through the doughnut ejecting opening 30 in the casing 25. The air is also drawn in part through the opening 54 in the plate 52 into which the tubular member 55 of the die mechanism 56 projects; and a circulation is thus set up which tends to effectively cool said die mechanism as well as the bottom of the dough magazine 35.

Having thus described my invention, I claim:

1. In cooking apparatus of the character described, a receptacle for hot cooking liquor; forming means including a dough magazine and associated die mechanism for releasing raw articles to be cooked to drop into the liquor; and an enclosure over the receptacle to confine the fumes rising from the liquor, said enclosure being laterally recessed at the exterior to afford a niche for the forming means aforesaid with provision for free circulation of air about the dough magazine.

2. In cooking apparatus of the character described, a receptacle for hot cooking liquor; forming means including a dough magazine with a tubular die outlet at the bottom through which raw articles to be cooked are released to drop into the receptacle; and an enclosure over the receptacle to confine the fumes rising from the liquor, said enclosure being laterally recessed to afford a niche for the forming means with provision for free circulation of air about the dough magazine, and the floor of the niche provided with an opening for projection of the tubular die outlet down into close proximity to the liquor in the receptacle.

3. In cooking apparatus of the character described, a receptacle for hot cooking liquor; means for forming raw articles of dough and releasing them to drop into the cooking receptacle including a dough magazine with a separate tubular member constituting a die outlet; and an enclosure over the receptacle to confine fumes rising from the cooking liquor, said enclosure being laterally recessed exteriorly to afford a niche for the forming means with the die outlet removably engaged through an opening in the floor of the niche and the dough magazine resting on said outlet.

4. In cooking apparatus of the character described, receptacle for hot cooking liquor; means for forming and releasing raw articles of dough to drop into the cooking receptacle including a dough magazine with associated die mechanism; an enclosure providing a chamber above the cooking receptacle for confinement of fumes rising from the liquor and a machinery compartment beneath the receptacle, the upper portion of said enclosure being laterally recessed exteriorly to afford a niche for the forming means with provision for free circulation of air about the dough magazine, and actuating means in the lower compartment of the enclosure with connections extending up through the receptacle and the floor of the niche to the die mechanism of the forming means.

5. In cooking apparatus of the character described, a receptacle for hot cooking liquor; means for forming and releasing raw articles of dough to drop into the cooking receptacle including a dough magazine with associated die mechanism; an enclosure providing a chamber above the cooking receptacle for confinement of fumes rising from the liquor and a machinery compartment beneath the receptacle, the upper portion of said enclosure being laterally recessed exteriorly to afford a niche for the forming means with provision for free circulation of air about the dough magazine, actuating means in the lower compartment of the enclosure with a connection extending up through the cooking receptacle and the floor of the niche to the die mechanism of the forming means; and means accessible at the niche to control operation of the die mechanism.

6. In cooking apparatus of the character described, a receptacle for hot cooking liquor; means for forming and releasing raw articles of dough to drop into the cooking receptacle including a dough magazine with associated die mechanism; an enclosure providing a chamber above the cooking receptacle for confinement of fumes rising from the liquor and a machinery compartment beneath the receptacle, the upper portion of said enclosure being laterally recessed exteriorly to afford a niche for the forming means with provision for free circulation of air about the dough magazine; an operating lever for the die means aforesaid pivotally supported in the floor of the niche; and actuating means in the lower compartment of the enclosure with a rod extending up through the receptacle and the floor of the niche and connecting with the operating lever for the die mechanism of the forming means.

7. In cooking apparatus of the character described, a receptacle for hot cooking liquor; means for forming and releasing raw articles of dough to drop into the cooking receptacle including a dough magazine with associated die mechanism; an enclosure providing a chamber above the cooking receptacle for confinement of fumes rising from the liquor and a machinery compartment beneath the receptacle, the upper portion of said enclosure being laterally recessed exteriorly to afford a niche for the forming means with provision for free circulation of air about the dough magazine; an operating lever for the die means aforesaid fulcrumed on the floor of the niche; actuating means in the lower compartment of the enclosure with a rod extending up through the receptacle and the floor of the enclosure for pivotal coordination with the die operating lever; and coupling means at the pivot whereby the lever may be operatively disconnected from the rod.

8. A device for manipulating free articles in cooking liquor comprising a vertically reciprocating member; an associated element mounted on a pivot supported by said member for engaging the articles from beneath while in the liquor and raising them; and means for swinging the element about the pivotal connection with said member to discharge the raised articles including a cam arm secured to the pivot and a cooperating fixed member continuously engaging said cam arm.

9. A device for manipulating free articles in cooking liquor comprising a vertically reciprocating member; an associated element mounted on a pivot supported by said member for engaging the articles from beneath while in the liquor and raising them; and means for swinging the element about the pivotal connection with said member after elevation of the articles above the liquor to turn them over incident to discharge, said means including a longitudinally slotted arm fixed to and extending tangentially from the pivot connection, and a positionally fixed stud to continuously engage the slot of said arm.

10. In cooking apparatus of the character described, a receptacle with a channel therein for cooking liquor; an intermittently operable cellular means for progressing the articles undergoing cooking along the channel while maintaining them in definite separation in the liquor; separate remotely spaced manipulating means movable up and down through the cells of the progressing means during dwell periods of the latter, one for turning over the articles during cooking and the other for ejecting them from the apparatus; a shaft with an eccentric disk and strap to directly actuate one of said manipulating means; and motion translating means coordinated with a crank pin on the eccentric disk to concurrently actuate the other of said manipulating means.

11. In cooking apparatus of the character described, a receptacle with a circular channel therein for cooking liquor; an intermittently rotating cellular means for progressing the articles undergoing cooking around the channel while maintaining them in definite separation in the liquor; manipulating means movable up and down at spaced points in the channel aforesaid through the cells of the progressing means during dwell periods of the latter, one for turning over the articles during cooking and the other for ejecting the cooked articles from the apparatus; a shaft with an eccentric disk and a strap to directly actuate one of the manipulating means; and motion translating means coordinated with a crank pin on the eccentric disk to concurrently actuate the other of said manipulating means.

12. In cooking apparatus of the character described, a receptacle for cooking liquor; an intermittently rotating cellular element to progress the articles being cooked in a circular channel of the cooking receptacle; manipulating means at different points in the channel movable up and down through the cells of the progressing element during dwell periods of the latter; and a drive shaft with a head whereto the progressing means is secured with capacity for angular adjustment relative to the manipulating means aforesaid.

13. In cooking apparatus of the character described, a receptacle for hot cooking liquor with an enclosure thereover; a conveyor outlet through which the fumes from the cooking liquor are conducted from the enclosure; and means for directing compressed air or the like axially into the outlet to stimulate exhaust therethrough.

14. In cooking apparatus of the character described, a receptacle for hot cooking liquor; an enclosure providing a chamber above the cooking receptacle and a chamber beneath it; a convergent outlet through which fumes from the cooking liquor are conducted from the upper chamber; an air compresser with drive means therefor in the lower chamber; and a delivery pipe leading from the compresser up through the receptacle and terminating in a nozzle for directing the compressed air axially into the convergent outlet aforesaid to stimulate exhaust therethrough.

15. In cooking apparatus of the character described, a receptacle for hot cooking liquor; an enclosure providing a chamber above the cooking receptacle, and a chamber for machinery beneath it; means drawing air from said machinery compartment with displacement thereof by fresh cooling air from without, compressing the withdrawn air, and utilizing it to effect eduction from the chamber above the cooking liquor of hot fumes rising from the cooking liquor.

16. In cooking apparatus of the character described, a receptacle for hot cooking liquor; an enclosure over the receptacle, a forming means comprising an exteriorly located dough magazine with die mechanism at the bottom extending through an opening in the enclosure into proximity to the cooking liquor and adapted to release raw formations of dough to drop into the receptacle; and evacuating means to draw the hot fumes rising from the cooking liquor out of the enclosure with induction of fresh outside air through the opening aforesaid and maintenance of a cooling circulation around the forming die mechanism and the bottom of the dough magazine.

In testimony whereof, I have hereunto signed my name at Ellicott City, Maryland, this 7th day of Aug., 1929.

HERBERT T. HUNTER.